R. CHESNUT.
Hay Raker and Loader.
No. 88,009.
Patented March 23, 1869.
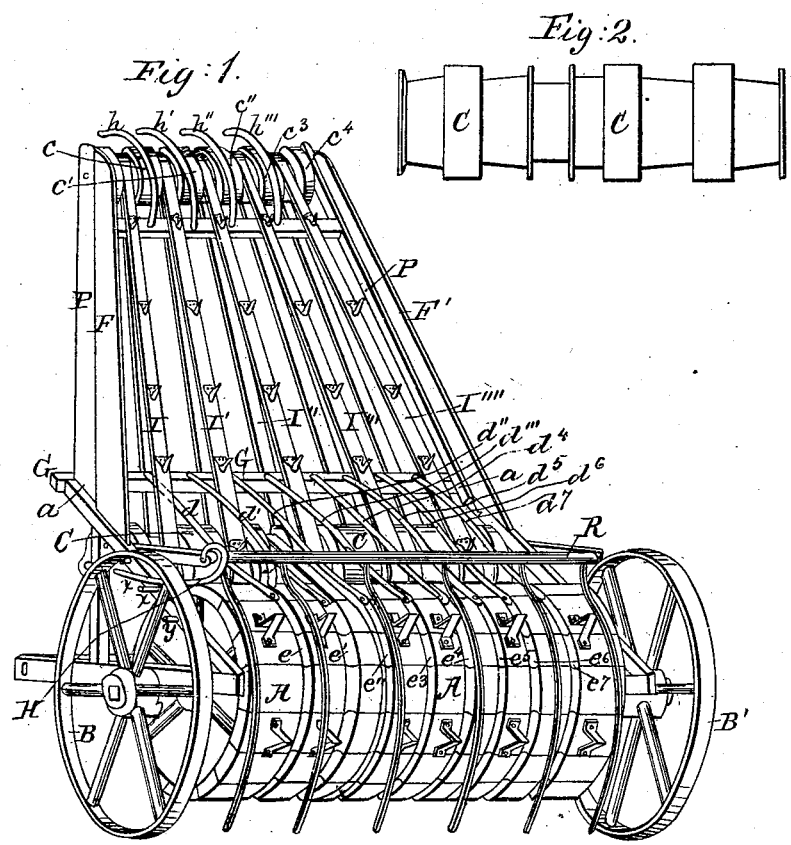

ROBERT CHESNUT, OF RICHMOND, INDIANA, ASSIGNOR TO HIMSELF AND GEORGE KELLY, OF SAME PLACE.

Letters Patent No. 88,009, dated March 23, 1869.

IMPROVEMENT IN HAY-RAKERS AND LOADERS.

The Schedule referred to in these Letters Patent and making part of the same.

*To all whom it may concern:*

Be it known that I, ROBERT CHESNUT, of Richmond, in the county of Wayne, and State of Indiana, have invented a new and improved Hay-Loader; and I do hereby declare that the following is a full and exact description thereof, reference being had to the accompanying drawings, making a part of this specification.

My invention relates to an improved hay-loader, whereby the hay is taken from the rake by means of a cylinder, armed with teeth for that purpose, and deposited upon guards, or rods, from which it is taken by hooks, placed upon convergent belts, that move with unequal velocities, thereby reducing the width of the mass of hay, as taken from the rake, and depositing it, in a convenient form, upon the wagon to which the loader is attached.

To enable others skilled in the art to make and use my invention, I will proceed to describe the same, with reference to the drawings.

The cylinder A is rigidly attached to an axle carried by the wheels B and B', the wheels and axle being furnished with clutches, which engage during the forward motion of the machine, thus revolving the cylinder, but which allow the wheels to revolve freely upon the axis during a backward movement of the same.

The rake is so formed and adjusted as partially to embrace the cylinder, and is held in position by a spring, H, resting upon the pin $x$.

Spikes are provided upon the surface of the cylinder A, to aid in carrying the hay upward from the rake.

The rods, $d\ d'\ d''$, &c., are attached to the cross-piece G, and terminate in the grooves $e\ e'\ e''$, &c., provided in cylinder A, the object of said rods, or guards being to receive the hay from the cylinder, and present it, to be carried upward by the hooks upon the belts I I' I'', &c.

C represents a series of pulleys, rigidly connected with each other, and revolved by means of a belt from the large cylinder A.

These pulleys are of unequal sizes, and are provided with belts I I', &c., which converge upon the shorter series of friction-pulleys $c\ c'\ c''$, &c., which move independently of each other.

In this example the central pulley of the series, represented at C, is largest, while the two outer ones are the smallest of the series.

By this arrangement, the mass of hay is drawn upward more rapidly at its middle part, thus avoiding a tendency to choke, or clog, which would otherwise occur, and tending, also, to concentrate the hay as deposited upon the wagon.

The curved rods $h\ h'$, &c., are secured in the cross-piece J, and are designed to disengage the hay from the hooks upon the belts I I', &c., and allow it to fall freely upon the load.

The fender-boards F F' are so attached as to admit of being raised slightly at their forward ends, and folded in upon the arms which support the rake.

When this is done, the frame P P', which is pivoted at $a\ a$, may be thrown back, thus loosening the belts I I', &c., which will then slide readily upon the pulleys C, and the machine may easily be moved from place to place.

For further convenience in moving, when not in use, the rake may be elevated from the ground, by disengaging the spring H from the pin $x$, and securing it behind a pin, $y$, provided for that purpose.

Having thus fully described my said invention,

What I claim, and desire to secure by Letters Patent, is—

1. The series of convergent belts I I', &c., in combination with the pulleys C, when the latter have unequal diameters, substantially as set forth.

2. In combination with the rake R, the toothed cylinder A, rods $d\ d'$, &c., pulleys C, and convergent belts I I', &c., the whole operating substantially as and for the purpose set forth.

ROBERT CHESNUT.

Witnesses:
ARTEMAS ROBERTS,
J. F. MOORE.